May 29, 1934.  L. F. PARKER  1,960,394
TUNNEL DIGGING APPARATUS
Filed Feb. 3, 1932  8 Sheets-Sheet 1
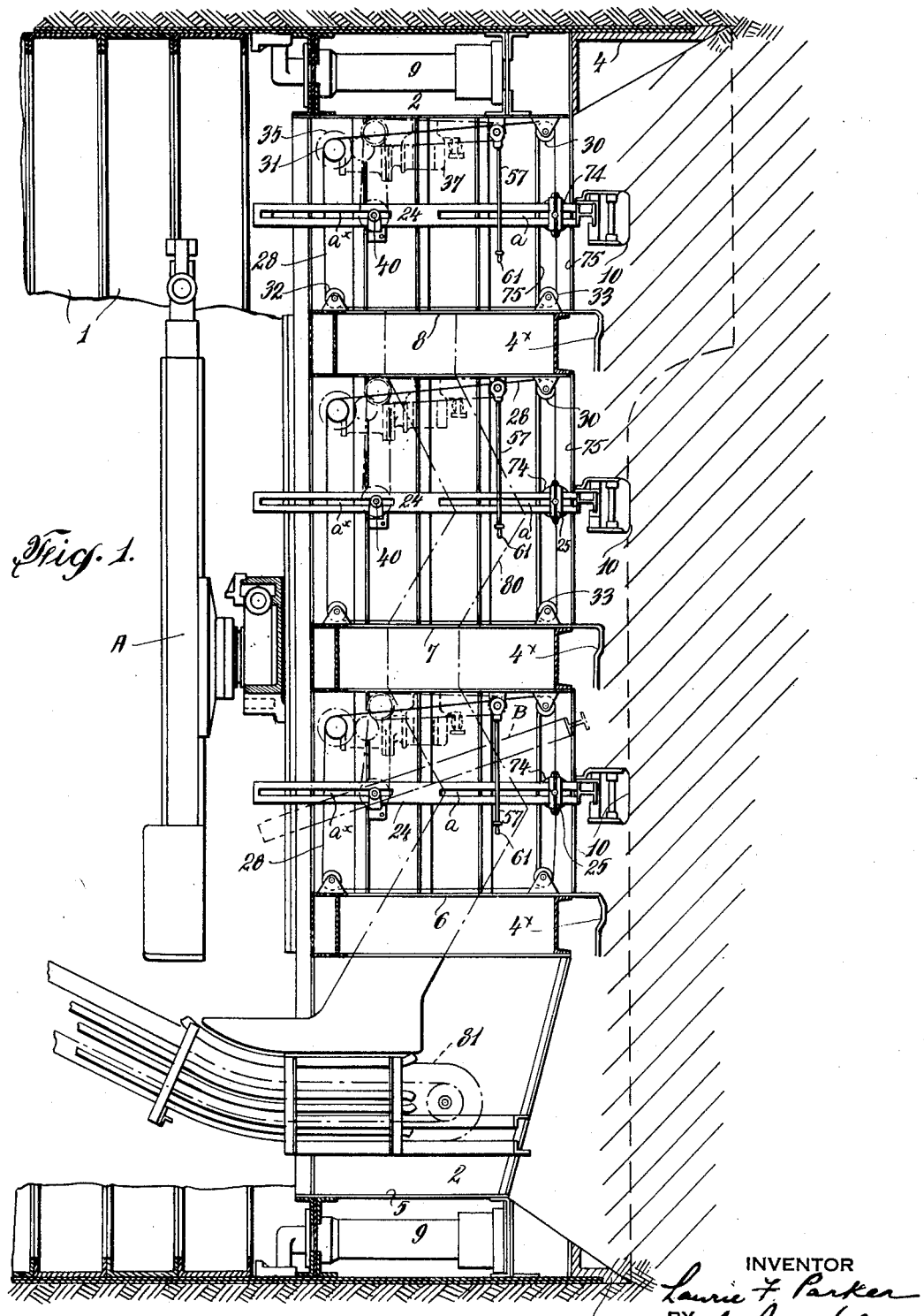

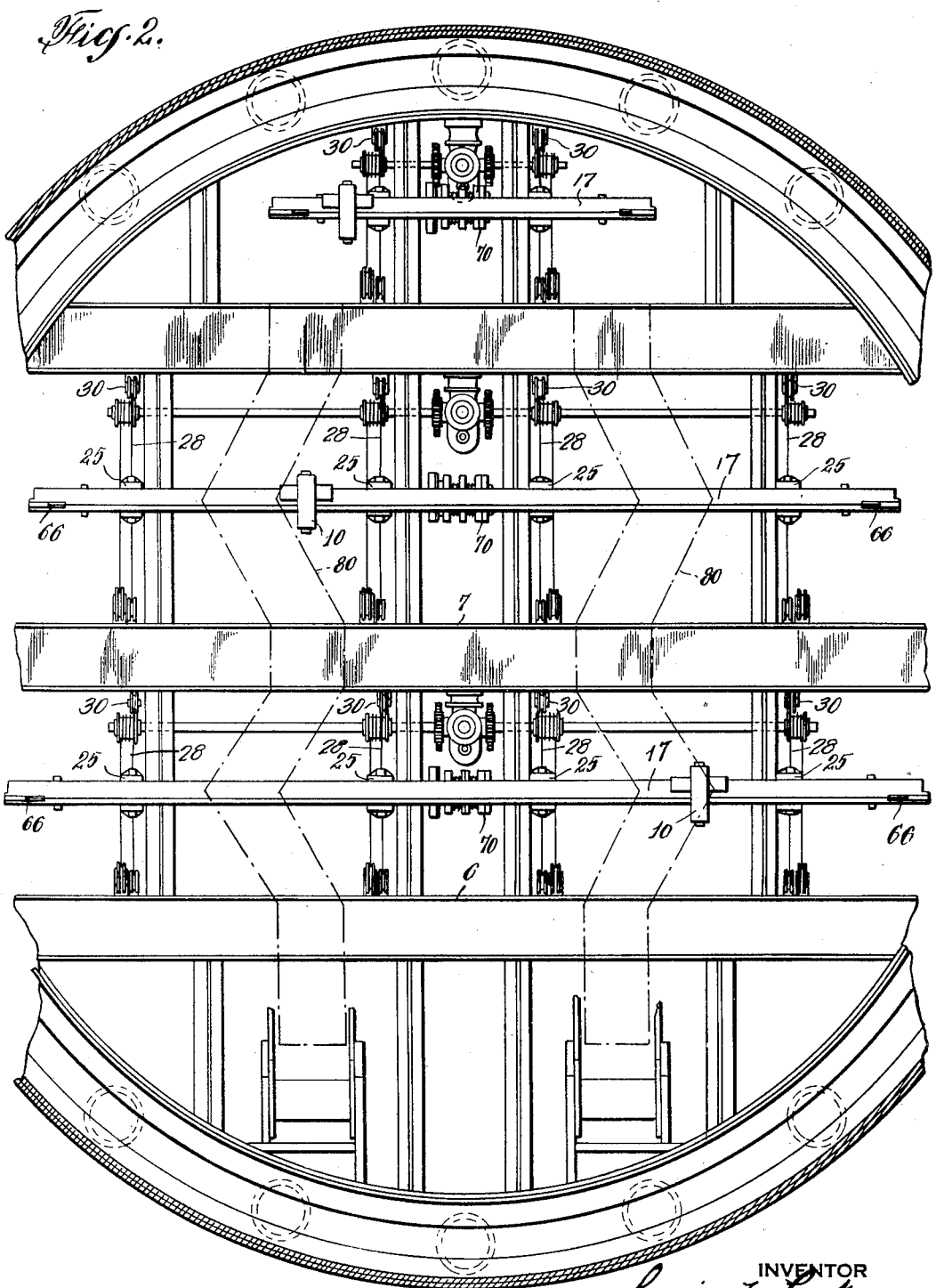

May 29, 1934.  L. F. PARKER  1,960,394
TUNNEL DIGGING APPARATUS
Filed Feb. 3, 1932  8 Sheets-Sheet 3
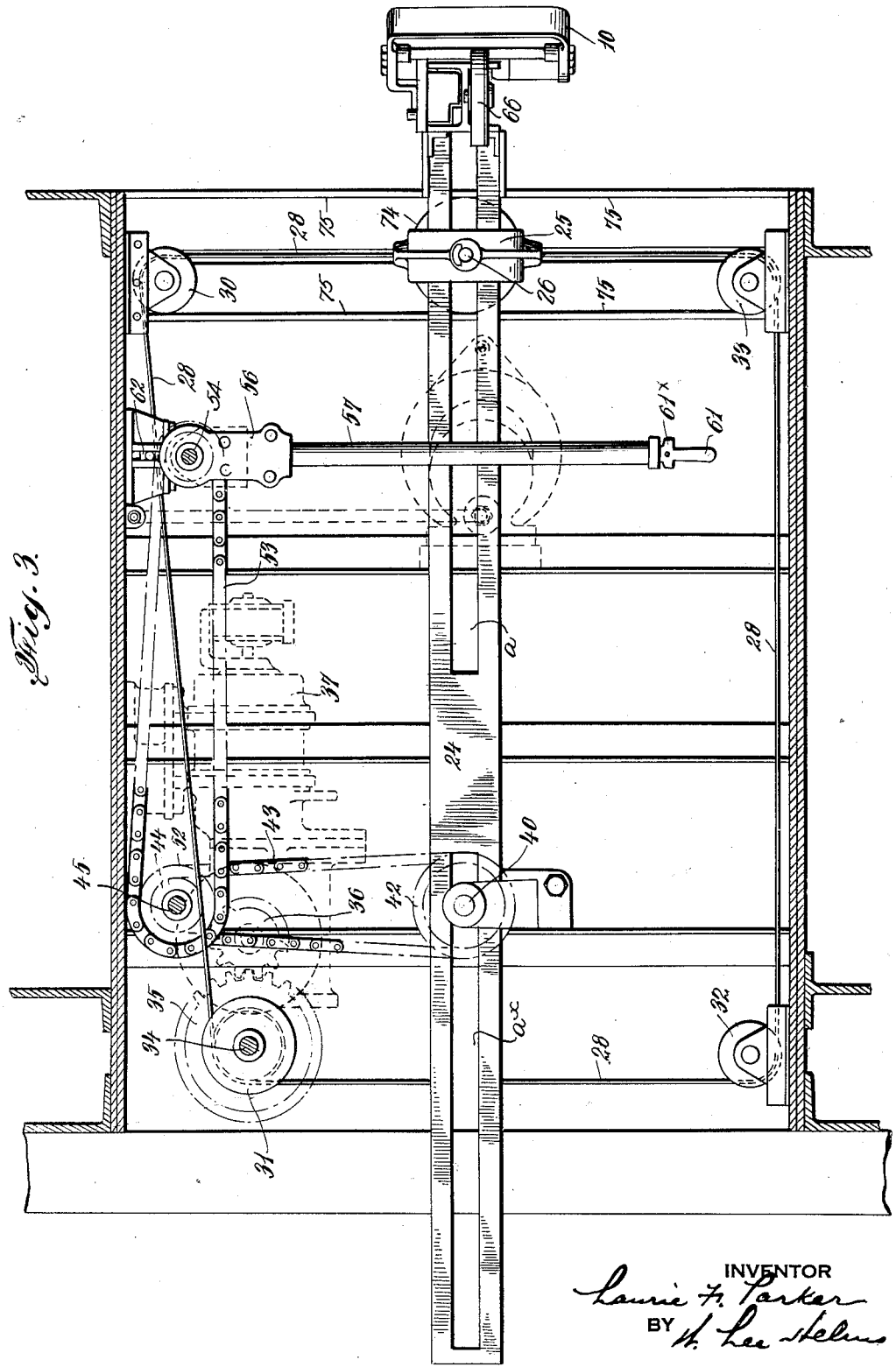

May 29, 1934.  L. F. PARKER  1,960,394
TUNNEL DIGGING APPARATUS
Filed Feb. 3, 1932   8 Sheets-Sheet 4
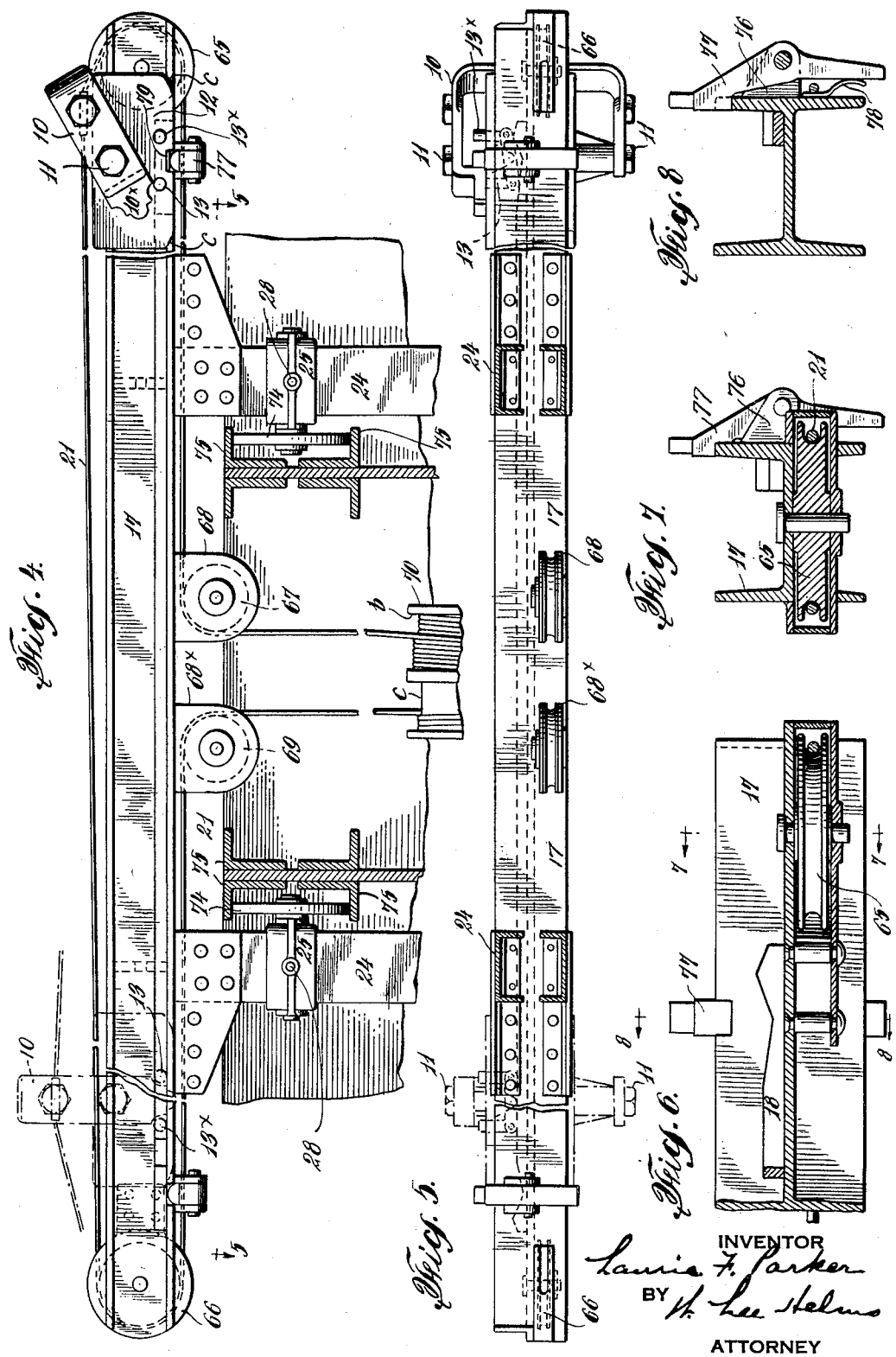

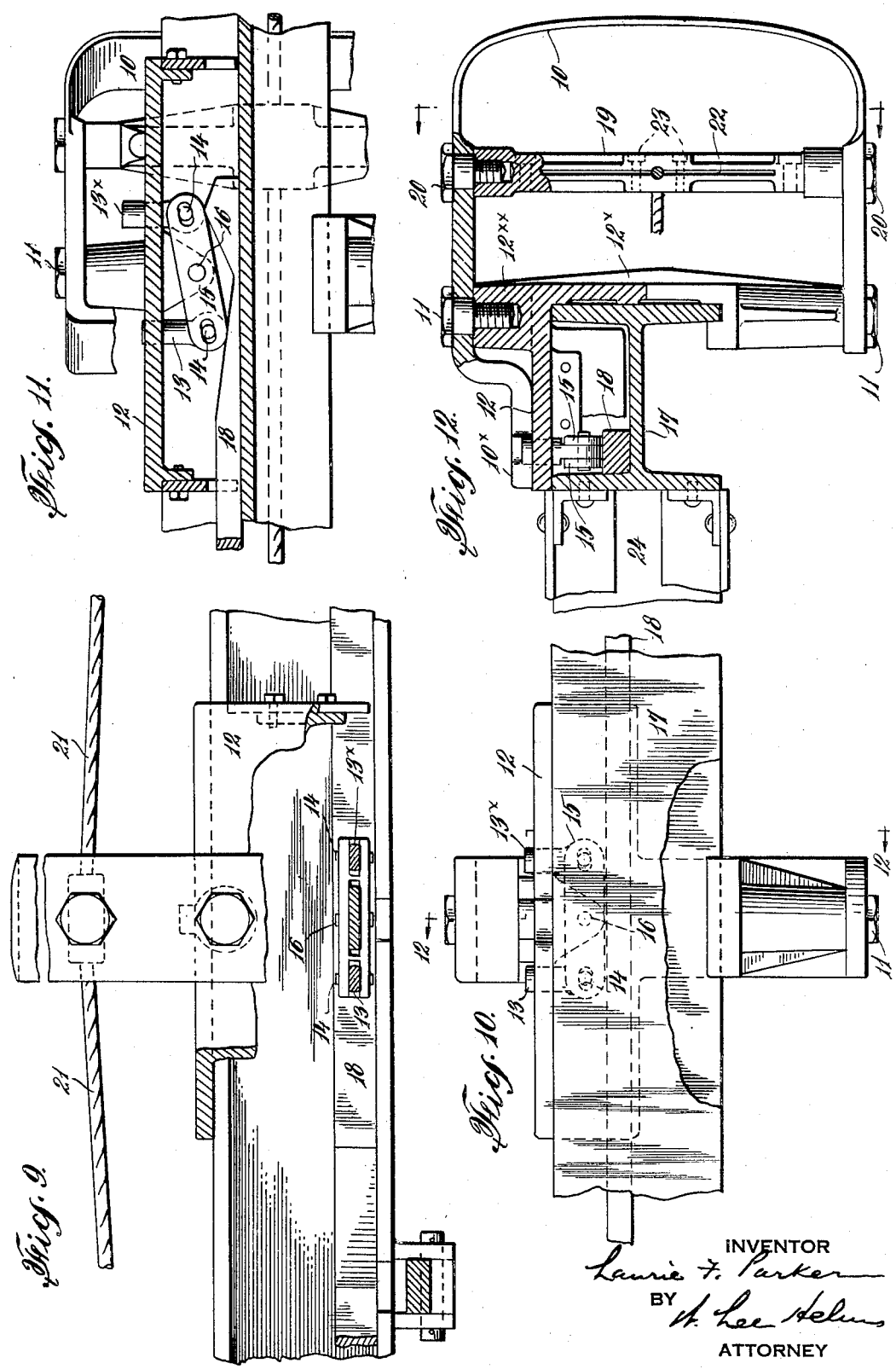

May 29, 1934.    L. F. PARKER    1,960,394
TUNNEL DIGGING APPARATUS
Filed Feb. 3, 1932    8 Sheets-Sheet 6
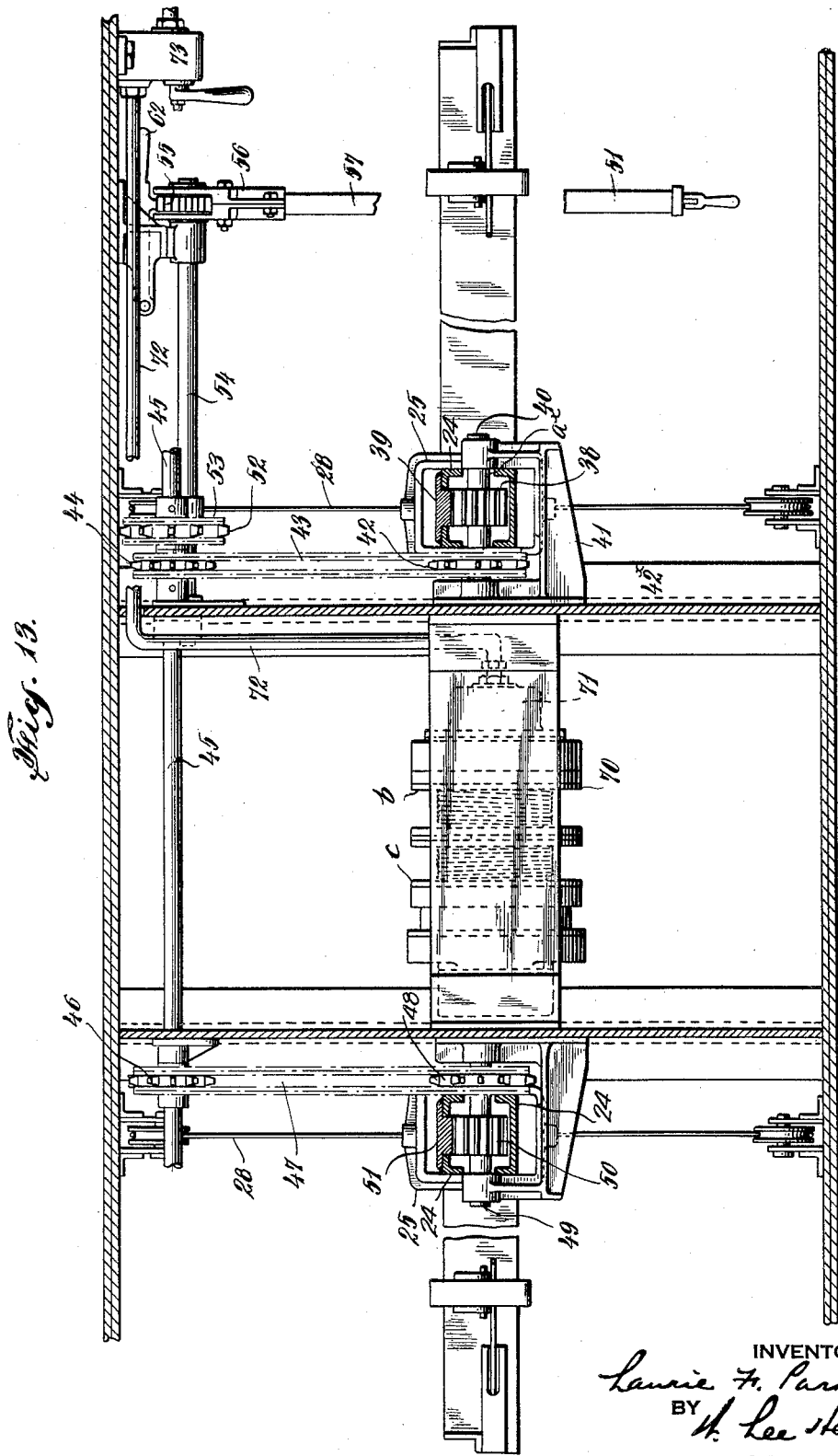
INVENTOR
Laurie F. Parker
BY
Lee Helms
ATTORNEY

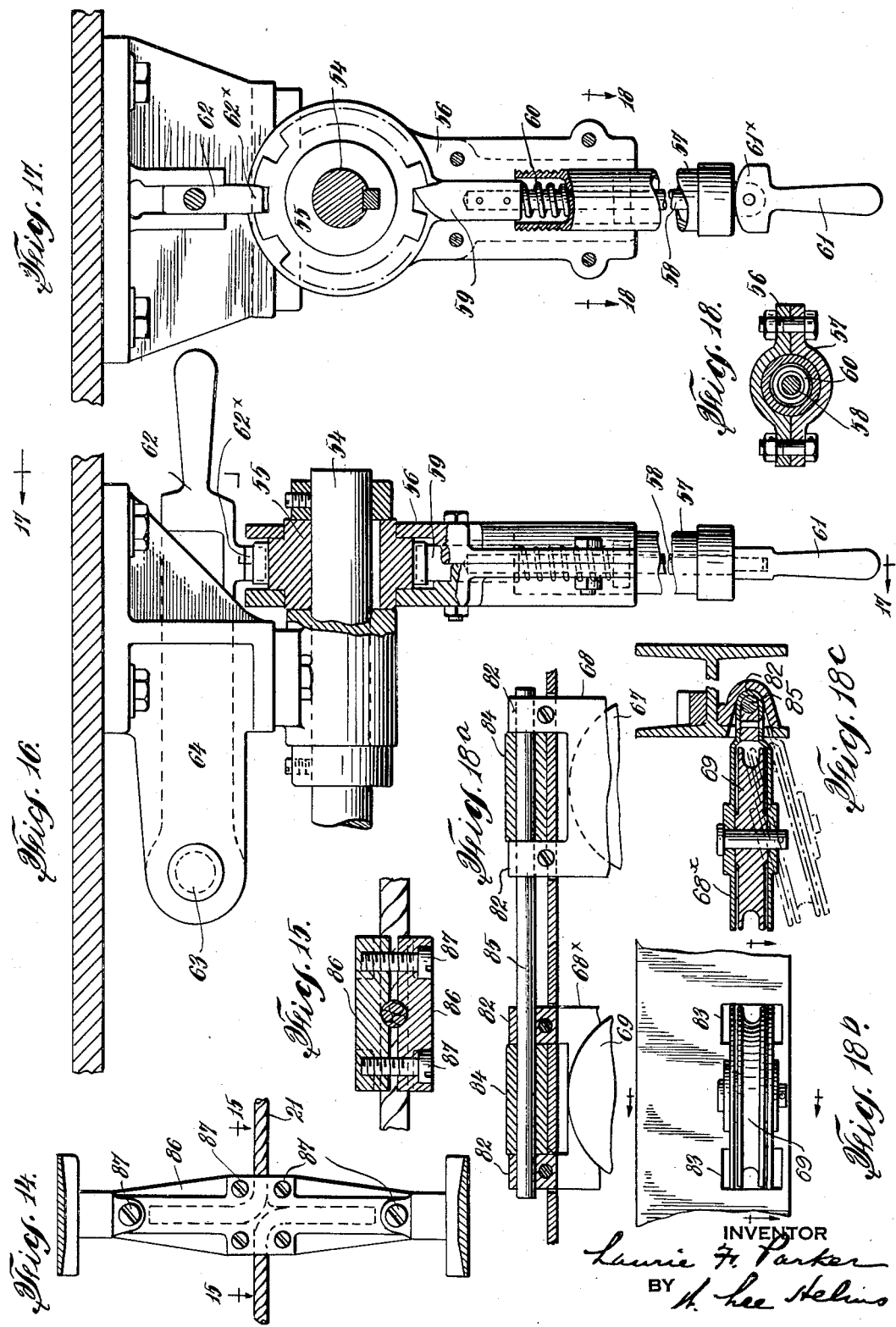

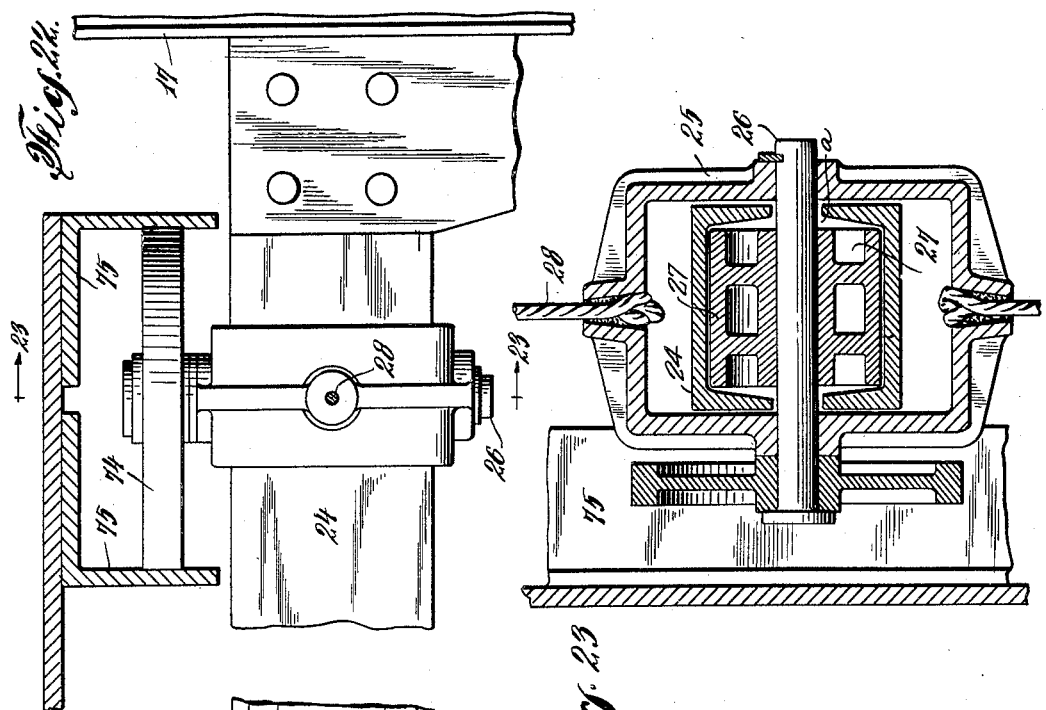

Patented May 29, 1934

1,960,394

UNITED STATES PATENT OFFICE 1,960,394

TUNNEL DIGGING APPARATUS

Laurie F. Parker, Boston, Mass., assignor to Silas Mason Co. Inc., East Boston, Mass., a corporation Application February 3, 1932, Serial No. 590,599

14 Claims. (Cl. 262—5)

The object is to provide a novel apparatus for digging tunnels, particularly tunnels of large diameter wherein, according to the usual practice, gangs of men on superimposed platforms follow the shield as it is pushed forward and dig out the earth in advance of the platforms, the earth being delivered to cars for transportation to points exterior of the tunnel. The characteristic of the present invention is the provision, as a primary cutting device, of a power-driven cutter movable both horizontally and vertically relative to the platform, and usually employed in series, one for each platform, the whole being carried by the shield itself and movable forwardly with the shield as the earth is cut away.

The cutter itself, together with the controlling and driving mechanism, is of novel construction, as will hereinafter be set forth in detail.

The invention will be described with reference to the accompanying drawings, in which—

Figure 1 is a view in side elevation, partly in section, of an embodiment of the apparatus, showing its relation to the shield, to the lined tunnel between it and to the left in advance of the shield;

Figure 2 is a view in front elevation, partly broken away, of the embodiment illustrated in Fig. 1;

Figure 3 is an enlarged side elevation showing one of the series of cutters and its operating and controlling mechanism;

Figure 4 is a plan view, partly in section, of one of the series of cutting devices and part of its operating and controlling mechanism, and Figure 5 is a rear elevation of the same, omitting certain elements;

Figure 6 is an enlarged view, partly in section, showing in end elevation part of the cutter beam, a pulley carried by the latter at its end and a cam for controlling the locking ends of the cutter;

Figure 7 is a transverse section on the line 7—7, Fig. 6;

Figure 8 is a transverse section on the line 8—8, Fig. 6;

Figure 9 is a side elevation showing a section of the cover beam adjacent the cam for actuating the locking pins for the cover blade, and showing the latter and its slide partly broken away;

Figure 10 is a rear elevation of a section of the cutter beam, showing the cutter slide mounted thereon and the locking pins during traverse of the cutter intermediate the ends of the beam;

Figure 11 is a rear elevation of a section of the cutter beam near the end thereof, partly broken away, showing the cutter in position after it has been swung to the right and illustrating the action of the cam;

Figure 12 is a vertical section on the line 12—12, Fig. 10;

Figure 13 is a rear elevation partly in section showing one of the cutter beams and its associated mechanism for raising and lowering it, for swinging it bodily in an arcuate path and for actuating the cutter slide;

Figure 14 is a plan view, partly in section, of the cutter blade showing more particularly the blade draw-bar and the means for anchoring the actuating cables;

Figure 15 is a vertical section on the line 15—15, Fig. 14;

Figure 16 is a front elevation, partly in section, of the actuating lever and connections leading to the means for raising and lowering the cutter beam, and Figure 17 is a side elevation of the same, partly in section, on the line 17—17, Fig. 16;

Figure 18 is a horizontal section on the line 18—18, Fig. 17;

Figure 18a is a plan view, partly in section, showing the pulleys 67, 69, brackets 68, 68x and the pivotal mounting therefor;

Figure 18b is a fragmentary elevation of the beam showing one of the said pulleys in position;

Figure 18c is a transverse section through one of the pulleys and its supporting bracket.

Figure 19 is a plan view partly in section showing one of the beam arms and the mechanism for advancing and retracting it;

Figure 20 is a fragmentary section on the line 20—20, Fig. 19;

Figure 21 is a section on the line 21—21, Fig. 19;

Fig. 22 is an enlarged plan view partly in section of one of the beam arms and certain of its carrying and guiding means, and Figure 23 is a sectional view on the line 23—23, Fig. 22.

Referring to Figure 1 of the drawings, 1 indicates a plurality of connected liners for the tunnel. Forwardly of the liner sections is a shield indicated generally at 2 having a front cutter ring 3 which at the top of the shield is extended to form a hood 4 so as to protect the workmen within the shield from earth falling from above the shield.

The shield, in the present embodiment, is provided with a plurality of platforms, indicated at 5, 6, 7 and 8 to receive the workmen engaged in the digging operation. Above each platform 6, 7 and 8 is located a vertically and horizontally movable cutter, and operating mechanism therefor, as later to be described. The shield will be advanced as the cutting proceeds, by means of jacks such as those indicated at 9.

*The cutter blade.*—The cutter blade may be of any desired form in accordance with the character of the matter to be excavated. If the earth is combined with gravel or rock, a tooth cutter will be found advantageous. In the present embodiment the cutter blade is more particularly adapted for clay formations and the like. It comprises a substantially U-shaped member 10 shown more particularly in Figures 3, 4 and 12, the legs of the U-shaped member being pivoted at 11 upon a carriage 12. One leg of the U-shaped member is formed with an extension 10x as shown more particularly in Figure 4, and is provided with curved opposed shoulders adapted to be engaged by latching pins 13, 13x to hold the cutter in a given active position.

In the operation of the cutter blade it is moved in a straight line and horizontally for the major portion of its cutting action and at the end of its action it is swung in an arcuate path. The latching pins serve to hold the cutter blade rigid during its straight-line cutting action. Pins 13, 13x at their lower ends carry studs 14 entering elongated slots in a connecting arm 15 pivoted at 16 upon a member of carriage 12, and the pins pass upwardly through apertures formed in the carriage.

*The cutter carriage and supporting means therefor.*—The cutter carriage is supported upon and adapted to slide lengthwise of an H-beam 17, hereinafter termed the "cutter beam". Carried by the cutter beam is a cam member 18 in register with connecting arm 15. The carriage 12 is formed with an upper horizontal section and an angularly extending section 12x having an upward extending boss 12xx threaded to receive the stud screw forming the upper pivot for the cutter, the carriage having a lower extension for receiving the lower pivot stud for the cutter. The lower extension of the carriage is provided with a horizontal channel, the walls of which embrace one leg of the H-beam serving to hold the carriage in position, as shown more particularly in Fig. 12. If desired, connecting arm 15 for the pins 13, 13x, at one side of the pins, may be duplicated by a similar arm at the opposite side of the pins, as shown in Fig. 12.

Extending vertically within the cutter is a strut bar 19 secured in position by stud screws 20 and having an aperture for the passageway of an operating cable 21, the cable being clamped in position by any suitable means as by having the bar longitudinally slotted in a line intersecting the aperture for the cable and screws threaded in apertures at opposite sides of the cable aperture, whereby rotation of the screws will tend to move the metal at each side of the slot together to clamp the cable, a suitable slot being shown in Fig. 12 at 22 and the position of the clamping screws being indicated at 23. Strut 19 may be rigidly connected to the cutter or may be pivotally connected.

*The cutter beam support.*—The cutter beam is carried by two beam carrying arms 24 which extend rearwardly of the cutter. Each arm may be made of connected upper and lower U-shaped steel beams, which beams for a substantial distance toward the front thereof and toward the back thereof are spaced to afford front and rear guideways a, a×, as shown in Fig. 3.

Surrounding each arm at the front thereof is a carrier member 25, the construction of which is best shown in Fig. 23. Journalled in the carrier member and extending through the front guide-way of each arm, that guide-way being indicated at Figs. 3 and 23, is a shaft 26 having thereon a roller 27 engaging the inner top and bottom walls of the beam carrying arm 24. Thus roller 27 is the member which immediately supports the said arm 24 toward the front end thereof. A cable 28 supports carrier 25, the cable being led over a sheave 30 and thence extending over a pulley 31 to a second sheave 32, thence to a third sheave 33 and thence upwardly to the carrier 25 for connection therewith. Pulley 31 is on a shaft 34 which shaft also carries a gear 35 in mesh with a pinion 36 connected to any suitable power device, as for example an engine as indicated at dotted lines 37, Fig. 3. When pinion 36 is turned in clockwise direction, cable 28 will raise the carrier and hence arm 24 and the cutter. When the rotation of pinion 36 is counter-clockwise, the cutter will be lowered.

The right hand carrying arm 24, Fig. 13, is supported toward the rear thereof by a gear 38 which engages a rack carried by a rack plate 39, the gear being mounted on a shaft 40 supported by a bracket 41 carried in turn by an upright 42x, Fig. 13. Shaft 40 carries a sprocket wheel 42 connected by a chain 43 to a sprocket wheel 44 on a shaft 45. Shaft 45 carries a second sprocket wheel 46 connected by a chain 47 to a sprocket wheel 48 on a shaft 49 having a gear 50 engaging a rack 51 on the second of the two beam carrying arms 24.

Inasmuch as the said second beam carrying arm is raised and lowered by devices exactly the same in construction as heretofore described with reference to the first-named arm, the same numerals are employed therefor in the drawings.

Shaft 45 carries a large sprocket wheel 52 (Figs. 3 and 13) connected by a chain 53 with a sprocket wheel on a shaft 54. Keyed to shaft 54 (Figs. 16 and 17) is a ratchet wheel 55 surrounding which is the hub 56 of an operating arm 57 adapted for manual operation. Operating arm 57 is hollow and projecting upwardly therein is a shaft 58 carrying a pawl 59 which engages the ratchet wheel. A spring 60 surrounding shaft 58 serves to normally hold the ratchet against the pawl. A handle 61 pivoted to the shaft 58 and having a cam head 61x may be swung on its pivot point to move the shaft and pawl downwardly so that the pawl is carried out of engagement with the teeth of the ratchet.

Above shaft 54 is a latching arm 62 having a tooth 62x adapted to engage the teeth of the ratchet wheel so as to latch shaft 54 in a given position. Latching arm 62 is pivoted at 63 upon a bracket arm 64.

When the latching arm 62 is moved to inactive position, ratchet arm 57 may be reciprocated to rotate shaft 54 and, through the connections above described, actuate pinions 38 and 50 simultaneously to advance or retract the beam holding arms and hence move the beam forwardly or rearwardly.

*The carriage traversing means.*—Referring to Fig. 4 it will be seen that the beam 17 carries at one end a pulley 65 and at its opposite end a pulley 66. Cable 21 is led over both pulleys and thence one end is brought across the centre of the beam and around a pulley 67 carried by bracket 68 secured to the beam, the other end of cable 21 being guided around a pulley 69 on bracket 68x. The first-named end of the cable is wound upon section b of drum 70 and the other end of the cable is reversely wound on section c of the drum.

Drum 70 is connected to an air or other motor 71 having an inlet conduit 72 controlled by a manually operated valve 73 (Fig. 13). Suitable reversing means (not shown) will be provided in the air motor or intermediate the air motor and the drum 70 so that the latter may be driven in opposite directions. When drum section c winds in the cable, the cutter blade is moved from its position shown in full lines, Fig. 4, to the left. In the first action of the cable upon the blade the latter is swung in the arc of a circle to the left, pin 13 being retracted, as shown in Fig. 11, to permit this action. The cable tends to maintain the cutter in position at right angles to the longitudinal axis of the carriage, pin 13x acting as a stop for the cutter. When the carriage is moved beyond the cam faces of cam bar 18, both pins will be placed in projected active position and will remain in that position until the carriage is moved to the left and in contact with cam surfaces at the left-hand end of the beam of the same formation as those shown in Fig. 11. At this point the innermost pin 13 will be retracted, causing the cutter to be moved in the arc of a circle.

In the position of the beam in an actual cutting operation, arms 24 will be advanced until the cutter is either in actual contact with the earth or a desired distance therefrom. The subsequent arcuate movement of the blade will cut the required distance into the earth and then, the cutter having swung to a position for horizontal cutting, its subsequent bodily movement will slice the earth until the cutter approaches the opposite end of the beam, at which time its arcuate movement will sever the end of the slice and retract the blade in the position for raising or lowering the beam to a new cutting position. Thus the earth is removed by succession of horizontal slices.

A latching device is provided for the carriage at the end of each movement thereof preliminary to the arcuate movement of the cutter. For this purpose the beam near each end thereof is provided with a bracket arm 76 to which is pivoted a latching arm 77 having a rearwardly projected end engaged by a spring 78. Each end of the carriage 12 is rounded at c, Fig. 4, and intermediate the rounded ends is a recess 79 to receive the latching end of arm 77. Thus during the movement of the carriage when its outer end strikes latching arm 77, the latter is moved away against the tension of spring 78 until it comes into register with recess 79, whereupon the active end of the latching arm moves into the recess. The extension 10x of the cutter acts as a finger when the cutter is swung to horizontal position, the finger depressing latching arm 77 and moving it out of the recess 79 so that the carriage may be free to traverse the beam.

I have heretofore described the mechanism for raising and lowering the beam and comprising cables 28 connected to carriers 25.

Reference to Fig. 4 will show that each carrier 25 has rotatably secured thereto a guide wheel 74 which is guided between two vertical plates having opposed angular flanges, the plates being indicated at 75, Fig. 4. In other words, when the carriers 25 are raised and lowered the beam carrying arms 24 are moved in an arcuate path but the carriers remain in vertical initial position being held and guided by wheels 74 and flanged plates 75.

If the beam is very long, more than two beam carrying arms, carriers and their supporting and operating elements may be employed, as shown in Fig. 2, above platforms 6 and 7, wherein four carriers 25 are employed for each beam.

In the operation of the apparatus the cutters will act, as above described, to cut away the earth in horizontal slices and the shield with its plurality of platforms will be advanced by the jacks followed by operation of the liner laying apparatus indicated generally at A and not forming a part of the present invention. The top platform as well as those below it will be protected by the overhanging wall 4 and each platform below the overhanging wall will be provided with an overhanging and depending section 4× to aid in protecting the men immediately below against falling earth. Workmen on each platform will deposit the cut-away earth in a suitable chute indicated at 80, which chute will deposit the earth on a suitable traveling apron indicated at 81 for transportation rearwardly of the cut. One or a plurality of chutes may be used for each platform as shown in Fig. 2, and each chute will lead to a single conveyor or to its individual conveyor as indicated in Fig. 2.

When the cutter has made a horizontal cut, the cutter beam will be raised or lowered to a new line of cut by operating the cables 28 by means of the engine 37 as above explained. In other words, the operator will manipulate valve 73 and any other control to cause the motor to rotate the drum 70 in the desired direction. When the series of cutters have through successive traversing actions cut off successive bands of earth within their sphere of action, the workmen can remove the earth not reached by the cutters, through the use of shovels, picks or other implements. It will not be necessary, however, to advance the shield after a single depth of cut inasmuch as operating arm 57 may be manipulated to rotate the shafts connected therewith so as to actuate gears 38 and 50 to move the beam forwardly for a new line of cut. Inasmuch as the beam is moved bodily in an arcuate path, as for example to the position illustrated in dotted lines at B, Fig. 1, operating arm 57 may be manipulated to advance the cutter beam at the proper time so as to compensate for the movement of the cutter away from the earth due to the arcuate movement of the beam.

To compensate for the arcuate movement of the beam and the changes in position of the cables between drum 70 and pulleys 67 and 69, I have provided the pulleys with the swinging brackets 68, 68x. As shown in Figs. 18a, 18b and 18c, each bracket is formed with two projecting straps 82 which pass through apertures 83 in the beam and which are pivoted to blocks 84 on the beam by means of a pivot rod 85. By this arrangement the pulleys may be laterally moved with their brackets to prevent jamming of the cables.

In Figs. 14 and 15 I have shown a modified method of securing the cutter traversing cable 21 to the cutter. The cable is cut and each end thereof led between two blocks 86 and the blocks clamped upon the cable by means of screws 87, the cable ends being bent at right angles between the blocks, shown more particularly at Fig. 14.

It will be understood that various modifications may be made in the form and arrangement of the elements shown in the drawings without departing from the spirit of the invention, for example, the manually operated means for rotating shaft 54 in order to advance and retract the cutter beam carrying arms may be substituted by a motor either air or electric and preferably interposing between the motor shaft and shaft 54 suitable reduction gearing.

Having described my invention, what I claim and desire to secure by Letters Patent is as follows:—

1. In tunnel digging apparatus, a cutter, a support upon which the cutter is movable; means for traversing the cutter upon said support means for holding the cutter rigid during a part of its traverse in a relatively long straight line path and means actuating the cutter to swing arcuately thereafter.

2. In tunnel digging apparatus, a cutter, a support upon which the cutter is movable, means for moving the cutter bodily in a straight line on the support, and means coacting with the support, the cutter and the actuating means therefor whereby the cutter may be movable arcuately relatively to the support, in combination with means for moving the support arcuately.

3. In tunnel digging apparatus, a beam, a cutter carried by the beam, means for reciprocating the cutter upon the beam, carrier arms for the beam, supporting means for the carrier arms permitting vertical arcuate movement thereof and rack and pinion devices for advancing and retracting the carrier arms.

4. In tunnel digging apparatus, a cutter, a beam for supporting the cutter, a carriage intermediate the cutter and the beam, means on the carriage for latching to it the cutter, means for bodily moving the carriage on the beam and means for releasing said latching means when the carriage has reached a predetermined position on the beam.

5. In tunnel digging apparatus, a cutter, a beam upon which the cutter is reciprocable, a carriage intermediate the cutter and the beam, latching means carried by the carriage for the cutter and means carried by the beam for releasing said latching means toward the end of a movement of the carriage on the beam.

6. In tunnel digging apparatus, a cutter, a beam, a carriage reciprocable on the beam, a cutter pivotally mounted on the carriage and latching means carried by the carriage for rigidly holding the cutter.

7. In tunnel digging apparatus, a beam, a carriage reciprocable on the beam, a cutter pivoted to the carriage, latching pins carried by the carriage for latching the cutter and means carried by the beam for actuating said latching pins.

8. In tunnel digging apparatus, a cutter, a beam, a carriage for the cutter mounted on the beam, means for reciprocating the carriage on the beam, a latching device carried by the carriage and cam devices carried by the beam for actuating said latching device.

9. In tunnel digging apparatus, a cutter, a beam, a carriage for the cutter mounted on the beam, means for reciprocating the carriage on the beam, latching pins carried by the carriage, means carried by the beam for holding the latching pins in active position during the major movement of the carriage on the beam, and means near each end of the beam for retracting a pin to permit swinging movement of the cutter on the carriage.

10. In devices of the character set forth, a cutter comprising a U-shaped leg having a rearward extension, a strut bar reinforcing the blade centrally thereof and being provided with a cable attaching device, and a pivotal mounting for the blade rearwardly of the strut bar.

11. In tunnel digging apparatus, a cutter, a beam upon which the cutter is reciprocable, carrier arms for the beam, each carrier arm being provided with spaced longitudinal apertures, a contact member in one of said apertures, means suspending the contact member and for raising and lowering the same with the carrier arm, a rack carried by the carrier arm adjacent the second aperture, a pinion within the aperture and engaging said rack and means for rotating the pinion to advance and retract the carrier arms.

12. In tunnel digging apparatus, a cutter, a beam upon which the cutter is reciprocable, carrier arms for the beam, a pivotal support for the carrier arms and upon which the arms are endwise movable, means suspending each carrier arm near its forward end, a contact member carrier by said means and a guide for said contact member maintaining its movement in a vertical line when the carrier arm is raised and lowered on its pivotal support.

13. In tunnel digging apparatus, a cutter, a beam, a carriage for the cutter mounted on the beam, means for reciprocating the carriage including a drum having two active sections and a cable having one end wound upon a drum section in a given direction and the second end wound upon a second drum section in reverse direction, guide pulleys for the cable ends, means for arcuately moving the beam and brackets pivotally mounted upon the beam and supporting said guide pulleys.

14. In tunnel digging apparatus, a cutter, a beam, a carriage mounted on the beam and pivotally supporting the cutter, a latching arm carried by the beam and adapted to latch the carriage against movement, and means on the cutter for releasing the latching arm when the cutter is pivotally moved.

LAURIE F. PARKER.